United States Patent
Rhee

(10) Patent No.: US 11,910,130 B2
(45) Date of Patent: Feb. 20, 2024

(54) MEDIA CONTROL DEVICE AND SYSTEM

(71) Applicant: Carnegie Mellon University, Pittsburgh, PA (US)

(72) Inventor: Jinmo Rhee, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 99 days.

(21) Appl. No.: 17/683,516

(22) Filed: Mar. 1, 2022

(65) Prior Publication Data
US 2022/0286646 A1 Sep. 8, 2022

Related U.S. Application Data

(60) Provisional application No. 63/155,403, filed on Mar. 2, 2021.

(51) Int. Cl.
*H04N 7/15* (2006.01)
*H04N 21/4788* (2011.01)
*H04N 21/422* (2011.01)

(52) U.S. Cl.
CPC .......... *H04N 7/15* (2013.01); *H04N 21/4221* (2013.01); *H04N 21/4788* (2013.01)

(58) Field of Classification Search
CPC .. G06F 3/0485; G06F 3/04886; G06F 3/0487; G06F 3/0489; G10L 17/00; G16H 40/67; G16H 80/00; H04L 65/403; H04L 12/1813; H04L 49/3081; H04N 7/142; H04N 7/147; H04N 7/15; H04N 21/25808; H04N 21/4221; H04N 21/43072; H04N 21/431; H04N 21/47; H04N 21/4781; H04N 21/4788; H04N 7/141; H04N 21/2343; H04N 21/42203; H04N 21/42204;
(Continued)

(56) References Cited

U.S. PATENT DOCUMENTS 4,686,698 A * 8/1987 Tompkins ............. H04M 3/567
348/E7.083
4,716,585 A * 12/1987 Tompkins ............. H04M 3/567
348/E7.083

(Continued)

*Primary Examiner* — Gerald Gauthier
(74) *Attorney, Agent, or Firm* — The Webb Law Firm

(57) ABSTRACT

Provided is a media control device system including a media control device including: a user interface configured to receive user input; and a communication interface configured to establish communication with a separate computing device. The system also includes a computer-readable non-transitory medium including program instructions that, when executed by a processor of the separate computing device, cause the separate computing device to detect a video conferencing application being executed by the separate computing device, in response to detecting the video conferencing application, determine an input configuration of the video conferencing application, receive a plurality of signals from the media control device via the communication interface, the plurality of signals representing a plurality of different user inputs, map the plurality of signals to a plurality of video conferencing application input signals based on the input configuration, and control the video conferencing application based on the video conferencing application input signals.

11 Claims, 8 Drawing Sheets

(58) Field of Classification Search
CPC ......... H04N 21/4316; H04N 21/44245; H04N 23/661; G08C 19/28; H04M 3/56; H04M 3/567

See application file for complete search history.

(56) References Cited

U.S. PATENT DOCUMENTS

| | | | | |
|---|---|---|---|---|
| 5,014,267 A * | 5/1991 | Tompkins | ................ | H04N 7/15 348/E7.083 |
| 5,574,778 A * | 11/1996 | Ely | .................... | H04L 49/3081 348/E7.071 |
| 6,380,990 B1 * | 4/2002 | Bessel | ............. | H04N 21/42204 348/E5.103 |
| 6,489,986 B1 * | 12/2002 | Allen | ..................... | H04N 21/47 348/E5.103 |
| 7,221,386 B2 * | 5/2007 | Thacher | ........... | H04N 21/25808 348/E7.083 |
| 7,907,222 B2 * | 3/2011 | Haughawout | .......... | G08C 19/28 348/14.05 |
| 8,466,951 B2 * | 6/2013 | Huang | ............. | H04N 21/42203 348/14.05 |
| 8,896,651 B2 * | 11/2014 | Chu | ..................... | H04L 65/403 348/14.05 |
| 8,896,654 B2 * | 11/2014 | Gratton | ............. | H04N 21/4316 348/14.05 |
| 8,937,636 B2 * | 1/2015 | Mock | ...................... | H04N 7/15 348/14.05 |
| 8,963,982 B2 * | 2/2015 | MacDonald | ............ | G10L 17/00 348/14.02 |
| 8,970,653 B2 * | 3/2015 | Bowen | ..................... | H04N 7/15 348/14.05 |
| 8,970,658 B2 * | 3/2015 | Mock | ................. | H04L 12/1813 348/14.05 |
| 8,988,483 B2 * | 3/2015 | Schwartz | ................ | G16H 80/00 715/716 |
| 10,751,612 B1 * | 8/2020 | Urbanus | ............ | H04N 21/4781 |
| 11,006,071 B2 * | 5/2021 | Pistilli | .................... | H04N 7/142 |
| 11,543,938 B2 * | 1/2023 | Clarke | .............. | H04N 21/8173 |
| 2002/0044201 A1 * | 4/2002 | Alexander | ............. | H04N 7/142 348/E7.083 |
| 2003/0169329 A1 * | 9/2003 | Parker | ...................... | H04N 7/15 348/E7.083 |
| 2004/0212701 A1 * | 10/2004 | Ladouceur | ............. | H04N 7/147 348/240.99 |
| 2010/0128105 A1 * | 5/2010 | Halavy | .................. | H04N 7/147 348/14.05 |
| 2013/0155175 A1 * | 6/2013 | Mock | ..................... | H04M 3/567 348/14.05 |
| 2013/0271558 A1 * | 10/2013 | Grimshaw | ............. | H04N 7/142 348/14.07 |
| 2013/0300820 A1 * | 11/2013 | Liu | .......................... | H04N 7/15 348/14.05 |
| 2014/0247318 A1 * | 9/2014 | Tucker | ............. | H04N 21/44245 348/14.05 |
| 2014/0282204 A1 * | 9/2014 | Park | ..................... | G06F 3/04886 715/773 |
| 2015/0201160 A1 * | 7/2015 | Polyakov | .................. | H04N 23/661 348/14.05 |
| 2015/0296177 A1 * | 10/2015 | Pinter | .................... | G16H 40/67 348/14.05 |
| 2016/0070368 A1 * | 3/2016 | Hong | .................... | G06F 3/0485 345/163 |
| 2016/0191575 A1 * | 6/2016 | Jain | ....................... | H04L 65/403 370/261 |
| 2017/0329486 A1 * | 11/2017 | Li | .......................... | G06F 3/0489 |
| 2017/0357387 A1 * | 12/2017 | Clarke | ................ | H04N 21/431 |
| 2018/0167578 A1 * | 6/2018 | Paxinos | ........... | H04N 21/43072 |
| 2019/0369827 A1 * | 12/2019 | Winer | .................... | G06F 3/0487 |
| 2021/0019982 A1 * | 1/2021 | Todd | ................ | H04N 21/2343 |
| 2022/0286646 A1 * | 9/2022 | Rhee | ...................... | H04N 7/142 |

\* cited by examiner

MEDIA CONTROL DEVICE AND SYSTEM

CROSS REFERENCE TO RELATED APPLICATION

The present application claims the benefit of U.S. Provisional Patent Application No. 63/155,403, filed on Mar. 2, 2021, the entire disclosure of which is incorporated by reference in its entirety.

BACKGROUND

1. Field

This disclosure relates generally to a media control device and medial control system.

2. Technical Considerations

Video conferencing applications, such as Zoom®, Skype®, Teams®, BlueJeans®, and/or the like, are used by individuals to conduct virtual meetings and are controlled through software settings specific to each application or platform. For example, a user that is speaking or otherwise presenting via one of these applications may have to locate their mouse, search through options, and/or otherwise provide inputs that disrupt the flow of the presentation and distract the presenter and audience.

SUMMARY

According to non-limiting embodiments or aspects, provided is a media control device system comprising: (a) a media control device comprising: a user interface configured to receive user input; and a communication interface configured to establish communication with a separate computing device; and (b) a computer-readable non-transitory medium including program instructions that, when executed by a processor of the separate computing device, cause the separate computing device to: detect a video conferencing application being executed by the separate computing device; in response to detecting the video conferencing application, determining an input configuration of the video conferencing application; receive a plurality of signals from the media control device via the communication interface, the plurality of signals representing a plurality of different user inputs; map the plurality of signals to a plurality of video conferencing application input signals based on the input configuration; and control the video conferencing application based on the video conferencing application input signals.

In non-limiting embodiments or aspects, the media control device further comprises a housing, and the user interface comprises a plurality of buttons arranged on the housing. In non-limiting embodiments or aspects, each button of the plurality of buttons is associated with a different function of the video conferencing application. In non-limiting embodiments or aspects, the program instructions are part of a device driver executing on the separate computing device. In non-limiting embodiments or aspects, the video conferencing application is controlled based on the at least one video conferencing application input signal by emulating, by the processor, the at least one video conferencing application input signal. In non-limiting embodiments or aspects, emulating the at least one video conferencing application input signal comprises generating at least one operating system-level command.

According to non-limiting embodiments or aspects, provided is a media control device comprising: a housing; a user interface configured to receive user input arranged on the housing; a communication interface configured to establish communication with a separate computing device; and a controller arranged in the housing and in communication with the user interface and the communication interface, the controller configured to: generate signals based on the user input, and control a video conferencing application executing on the separate computing device with the signals.

In non-limiting embodiments or aspects, the user interface comprises a plurality of buttons. In non-limiting embodiments or aspects, each button of the plurality of buttons is associated with a different function of the video conferencing application. In non-limiting embodiments or aspects, the controller generates the signals by converting the user input to keyboard inputs recognized by the video conferencing application.

According to non-limiting embodiments or aspects, provided is a media control method comprising: detecting, with a computing device, a video conferencing application being executed by the computing device; in response to detecting the video conferencing application, determining an input configuration of the video conferencing application; receiving at least one signal from a media control device via a communication interface of the media control device, the at least one signal representing a user input on the media control device of a plurality of possible user inputs, the media control device is separate from the computing device; mapping the at least one signal to at least one video conferencing application input signal based on the input configuration; and controlling the video conferencing application based on the at least one video conferencing application input signal.

In non-limiting embodiments or aspects, the media control device comprises a housing and a user interface, the user interface comprising a plurality of buttons arranged on the housing. In non-limiting embodiments or aspects, each button of the plurality of buttons produces a different signal when actuated, the method further including mapping each different signal to a different video conferencing application input signal based on the input configuration. In non-limiting embodiments or aspects, each button of the plurality of buttons is associated with a different function of the video conferencing application. In non-limiting embodiments or aspects, a device driver installed on the computing device maps the at least one signal to the at least one video conferencing application input signal and controls the video conferencing application. In non-limiting embodiments or aspects, controlling the video conferencing application based on the at least one video conferencing application input signal comprises emulating, with the computing device, the at least one video conferencing application input signal. In non-limiting embodiments or aspects, emulating the at least one video conferencing application input signal comprises generating at least one operating system-level command.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
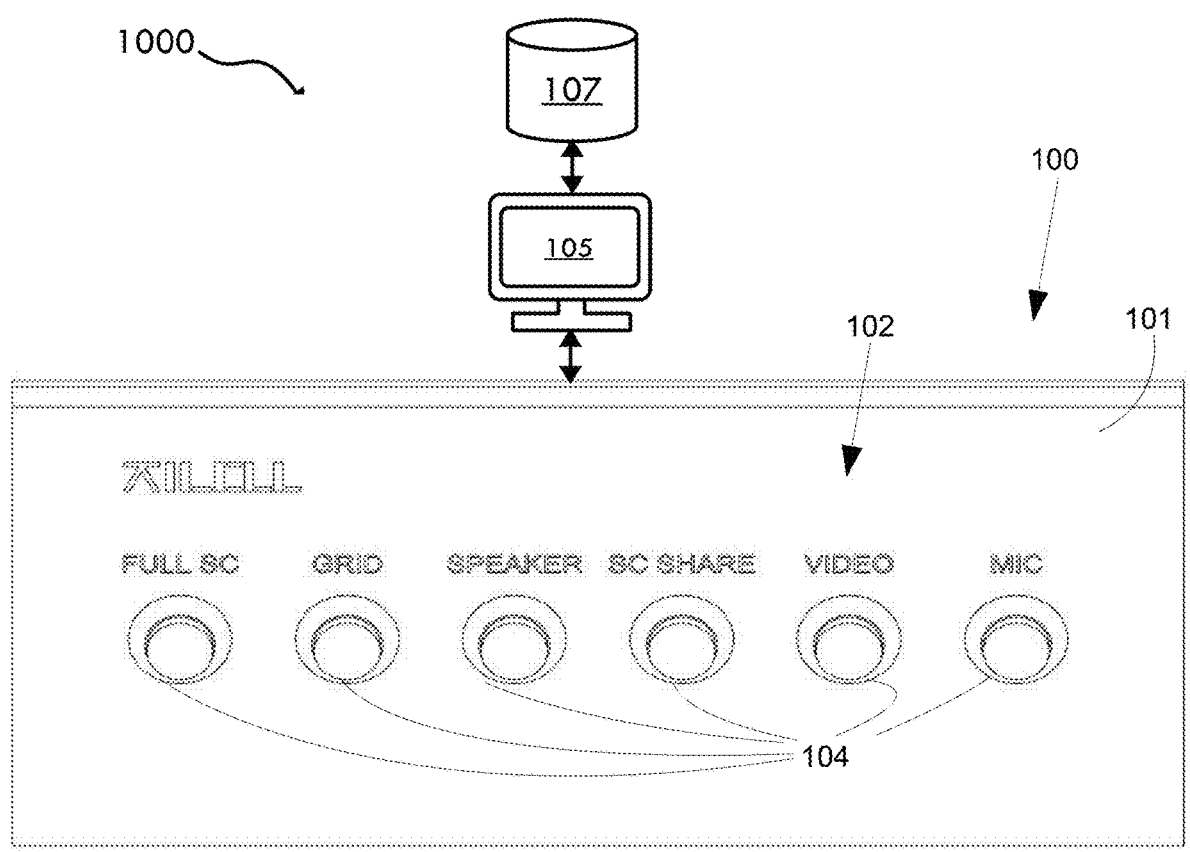
FIG. 1 is a schematic diagram of a media control system according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting. All numbers used in the specification and claims are to be understood as being modified in all instances by the term "about." The terms "approximately," "about," and "substantially" mean a range of plus or minus ten percent of the stated value.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer.

Referring to FIG. 1, a media control system 1000 is shown according to a non-limiting embodiment. The media control system 1000 includes a media control device 100 in communication with a separate computing device 105. The media control device 100 includes a housing 101 having a user interface 102. The user interface 102 includes several buttons 104. It will be appreciated that the user interface 102 may include one or more touch screens, switches, dials, and/or any other type of input device, in addition to or alternatively to the buttons 104. The buttons 104 represent different functions for a video conferencing application executed by the separate computing device 105. For example, each button 104 may be configured to cause a different function on a video conferencing application.

As used herein, the term "video conferencing application" refers to any software application that provides for audio and video communication between two or more computing devices, such as but not limited to video conferencing platforms including Zoom®, Skype®, Teams®, BlueJeans®, and/or the like.

Still referring to FIG. 1, the separate computing device 105 may be any type of computing device including a processor, such as a desktop computer, laptop computer, tablet computer, smartphone, server computer, and/or the like. The computing device 105 may be in communication with the media control device 100 via a wired or wireless connection, such as a USB cable, a WiFi® connection, a Bluetooth® connection, and/or the like. The computing device 105 may include or be in communication with a data storage device 107 including applications that execute on the computing device 105. The data storage device 107 may also store one or more device drivers, such as a device driver for facilitating communication between the computing device 105 and the media control device 100. As an example, a device driver may be executed by an operating system of the computing device 105 such that signals from the media control device 100 are interpreted by the computing device 105 and/or applications being executed on the computing device 105. In non-limiting examples, the data storage device 107 and/or another data storage device in local or remote communication with the computing device 105 may store input configurations for each of a plurality of different video conferencing applications. For example, a map of keyboard and/or mouse commands may be mapped to functions within a video conferencing application. The input configurations may be stored with respect to each video conferencing application and/or may be separately stored as aggregated data in a database.

Figure 2:
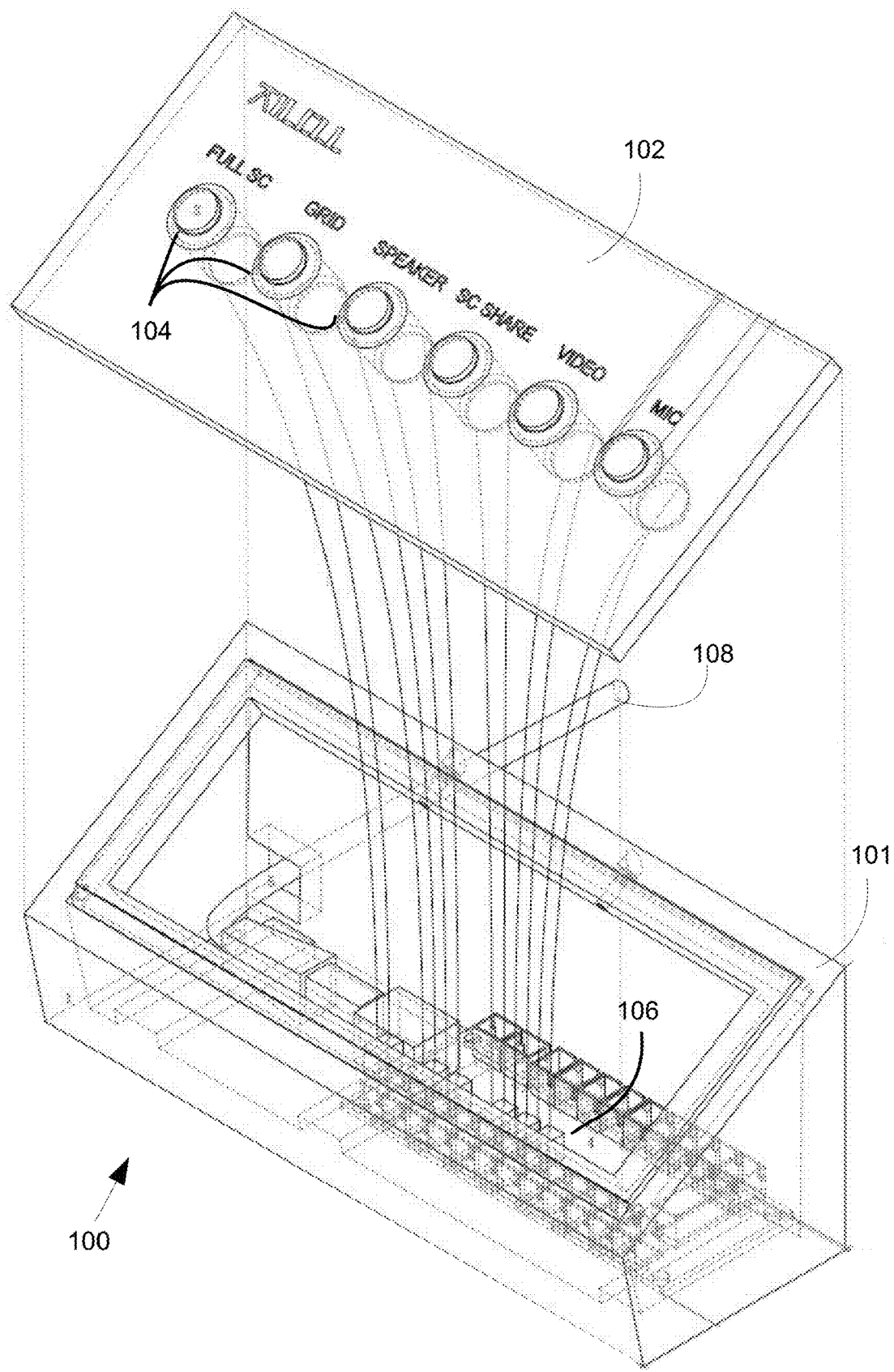
FIG. 2 is an exploded view of a media control device according to a non-limiting embodiment.

Referring now to FIG. 2, an exploded view of a media control device 100 is shown according to a non-limiting embodiment. A controller 106 is arranged inside the housing 101. The controller 106 may be any device configured to receive inputs from the user interface 102 and communicate signals based on those inputs to the separate computing device 105. For example, the controller 106 may be an encoder configured to encode signals from the user interface 102. In some examples, the controller 106 may include a circuit board including an integrated circuit (IC) programmed to encode user inputs from the buttons 104 to digital signals. The controller 106 may include, for example, a USB encoder chip, a network controller chip, and/or the like. In some examples, the controller 106 may be a computing device including a processor, such as a Central Processing Unit (CPU) or a microprocessor. The controller 106 generates output signals that are output through a wired or wireless connection. The example shown in FIG. 2 includes a cable 108, such as a USB cable, for outputting signals.

In non-limiting embodiments, the media control device 100 includes buttons 104 or other means of user input that can be customized and mapped to different functions in a video conferencing application. By including several buttons or other user inputs on a media control device 100 separate from another computing device used to execute the video conferencing application, users are provided with instant access to the features of a video conferencing application without the necessary amount of physical movement. For example, during a video conference a user may wish to execute several different functions of a video conferencing application, such as switching to a full screen mode, switching to a grid view, sharing one or more screens, muting a microphone, muting a speaker, turning video on or off, and/or the like. These features can be activated swiftly and without undesired movements, allowing users such as teachers and other presenters to seamlessly present and interact with an audience.

In some examples, a media control device 100 may have preset buttons and customizable buttons. In other examples, all of the buttons or inputs may be customizable. A user may customize the buttons 104 through a separate computing device, such as through a software application on the computing device 105 that adapts settings for a device driver for the media control device. A user may also customize the buttons through the media control device 100 itself or through a separate device (e.g., such as a smartphone) in communication with the media control device 100. In such examples, the media control device 100 may include memory configured to store the settings in a manner that is accessible to the controller 106.

The media control device 100 may issue commands to the video conferencing application in several different ways. For example, in some non-limiting embodiments, the user inputs may be encoded as keyboard inputs, such as one or more key presses, by the media control device 100 or by a device driver executing on the computing device 105. The processing of the user inputs may be performed by the media control device 100, such as controller 106, the separate computing device 105, and/or a combination thereof. In some non-limiting embodiments, the user inputs may be mapped to communicate via an Application Programming Interface (API) associated with the video conferencing application. In some non-limiting embodiments, the user inputs may be mapped to a sequence of other inputs, such as a combination of keystrokes, mouse movements, and/or the like.

In non-limiting embodiments, the configuration of the user inputs may be modified based on the video conferencing application being used. For example, a device driver, the media control device 100, and/or an application on the separate computing device 105 may determine preset or customized shortcut configurations for a particular video conferencing application. In response to determining what video conferencing application is being executed (e.g., Zoom® or Skype®), the corresponding configurations may be used to map the signals from the media control device 100 to signals (e.g., such as key strokes) that are recognized by the relevant video conferencing platform. Thus, even if shortcuts for "full screen mode" are different keys in different video conferencing applications, a user only needs to press a single button 104 or input on the media control device 100 while using either video conferencing application.

Figure 3A:
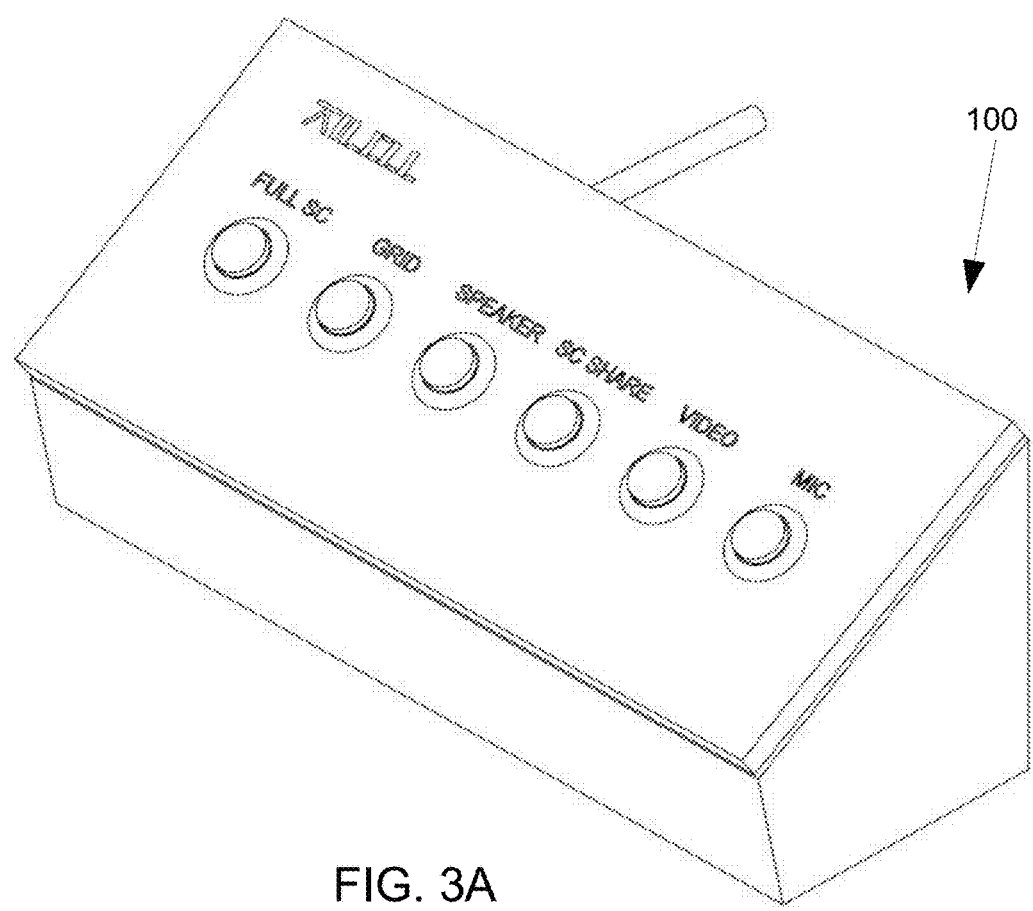
FIGS. 3A-3F show a media control device according to non-limiting embodiments.
Figure 3B:
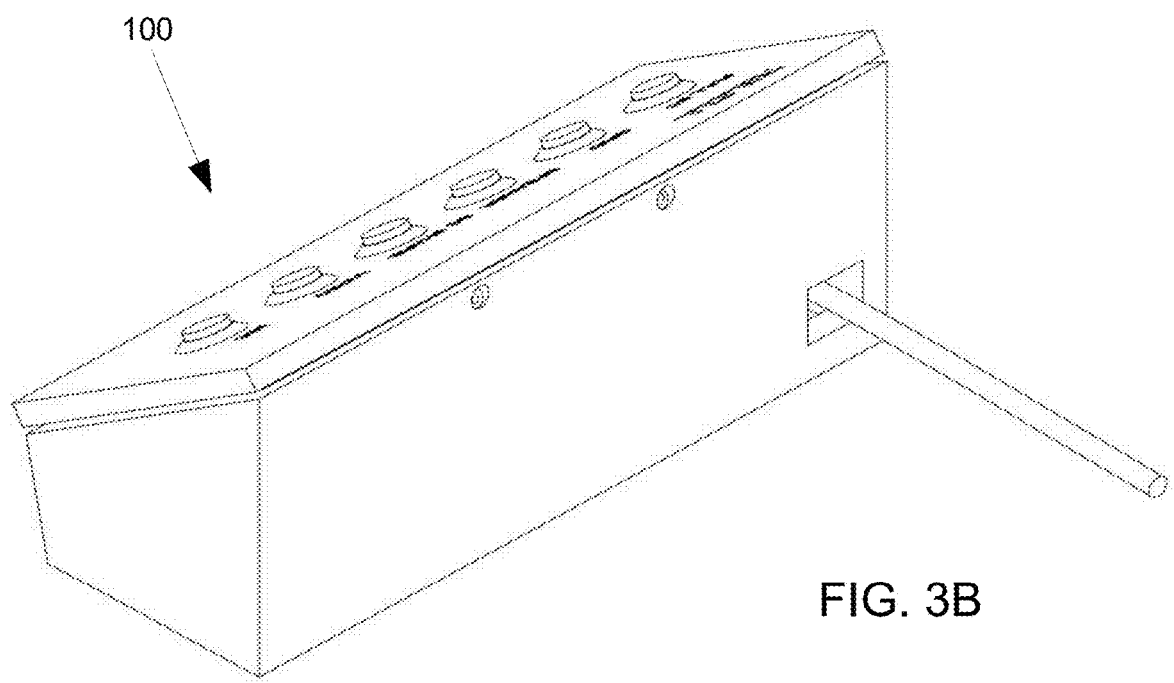
Figure 3C:
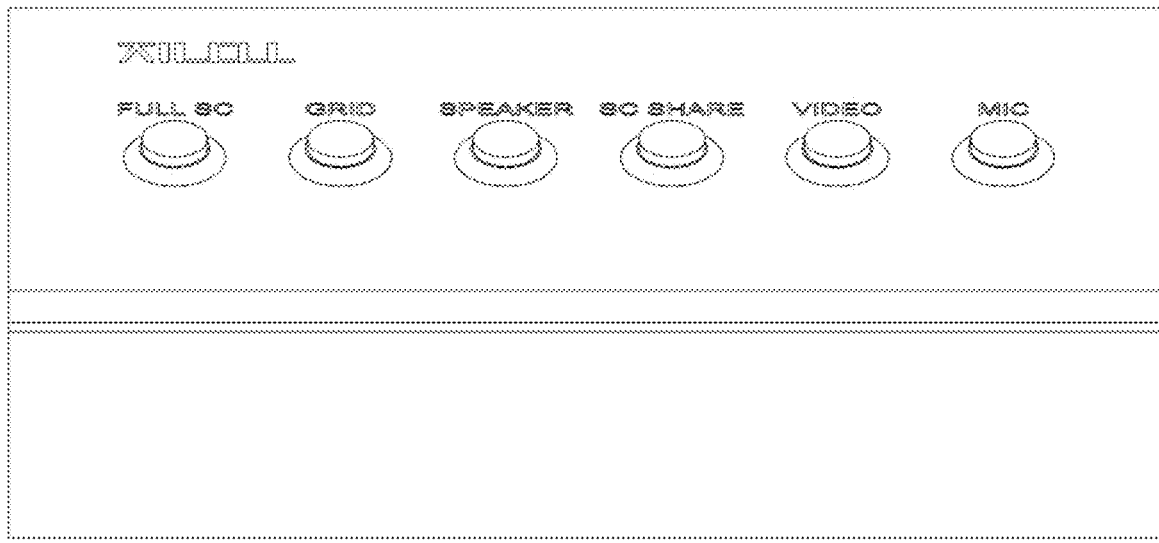
Figure 3D:
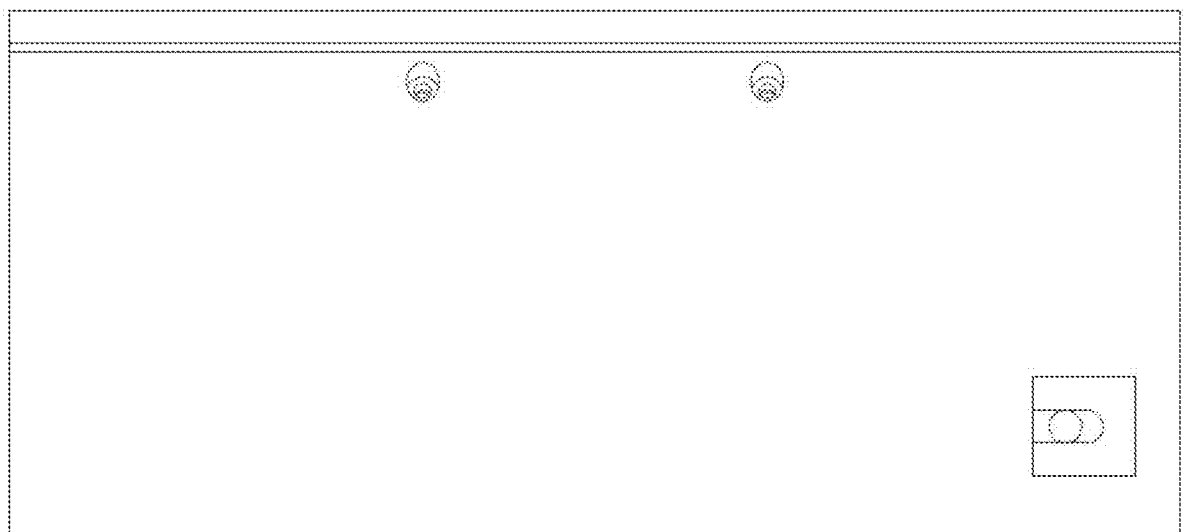
Figure 3E:
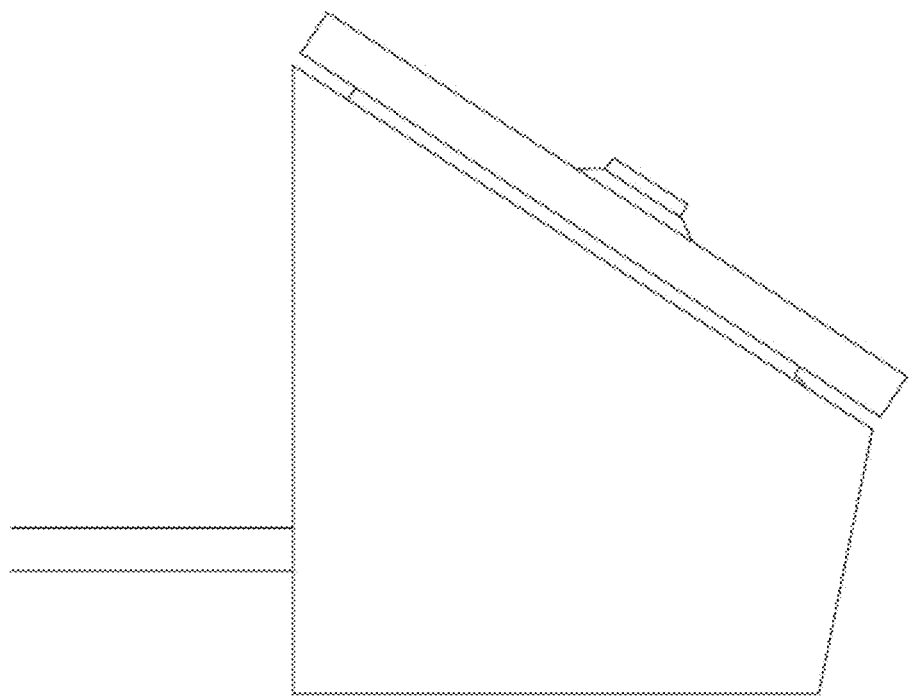
Figure 3F:
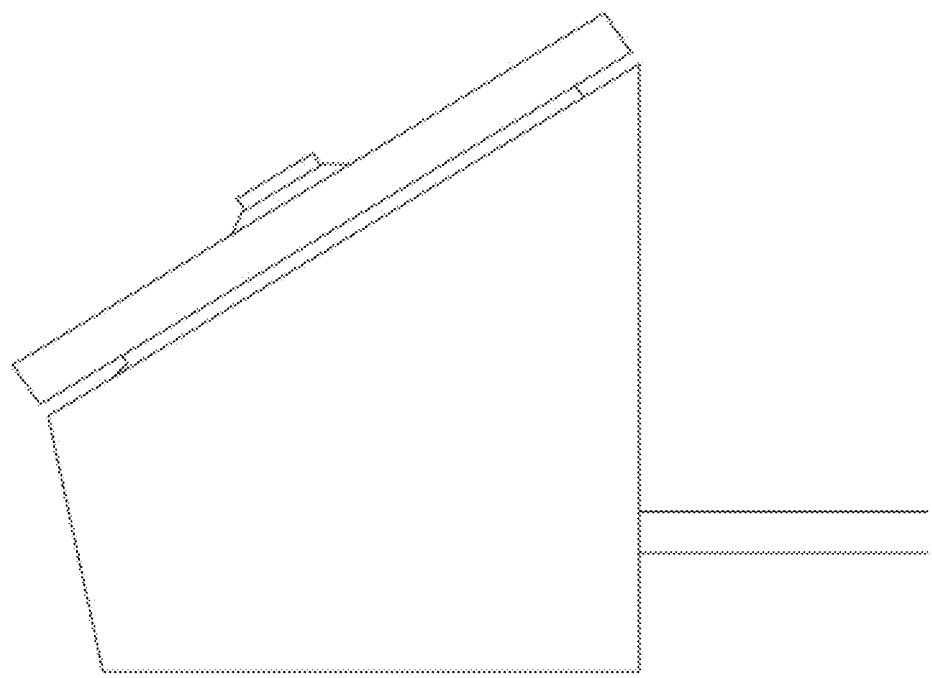

Referring now to FIGS. 3A-3F, shown are views of a media control device 100 according to non-limiting embodiments. FIG. 3A shows a front perspective view. FIG. 3B shows a back perspective view. FIG. 3C shows a front view. FIG. 3D shows a back view. FIG. 3E shows a left side view. FIG. 3F shows a right side view.

Figure 4:
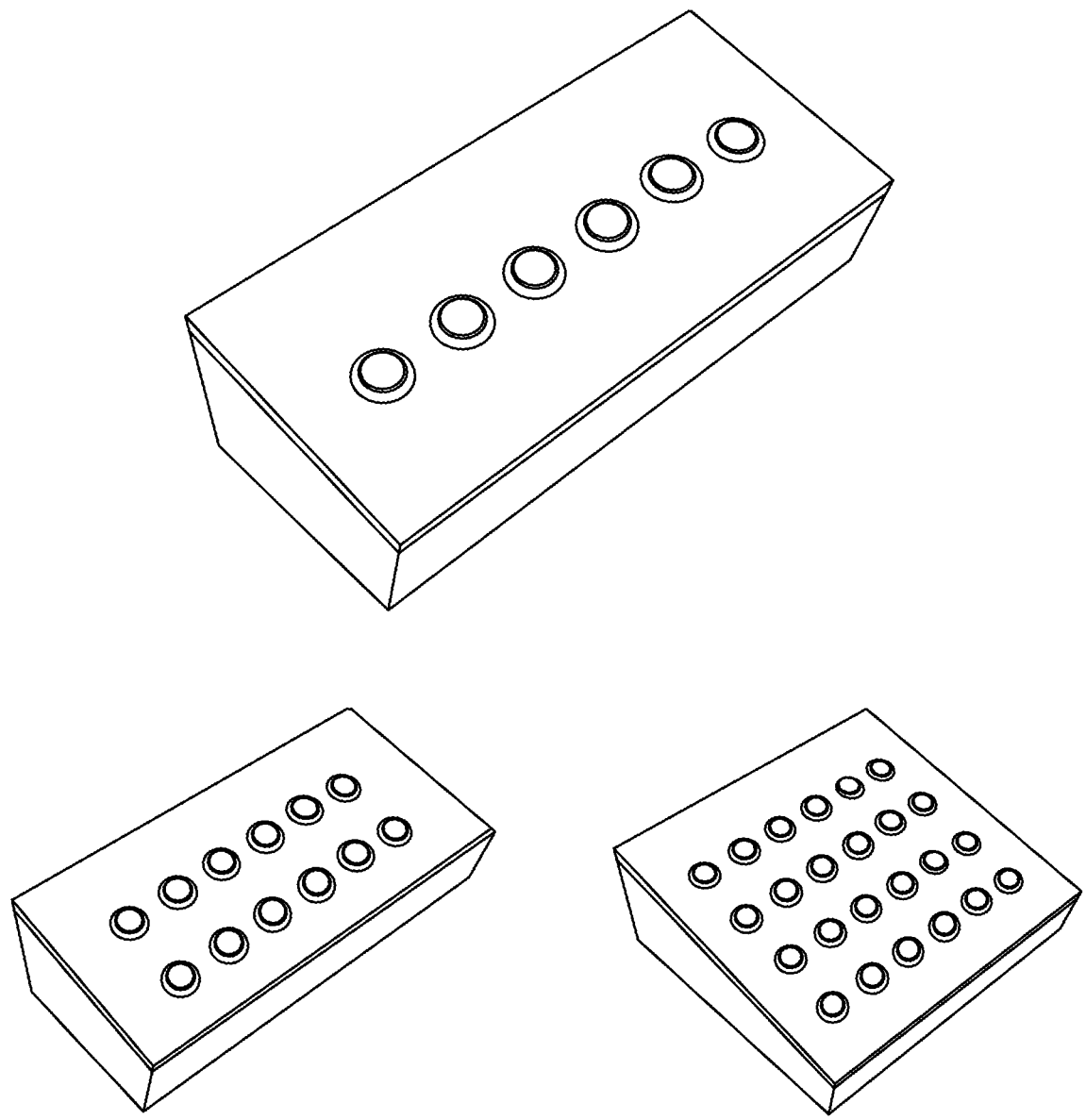
FIG. 4 shows media control devices according to non-limiting embodiments.

Referring now to FIG. 4, configurations and arrangements of media control devices according to different embodiments. As shown, the media control device may include any number of buttons or other input devices and may be shaped in various ways. Different types of users may require more buttons than others. In some examples, buttons may be mapped to other software functions that users wish to activate during a presentation, such as actions in PowerPoint® or Windows®.

Figure 5:
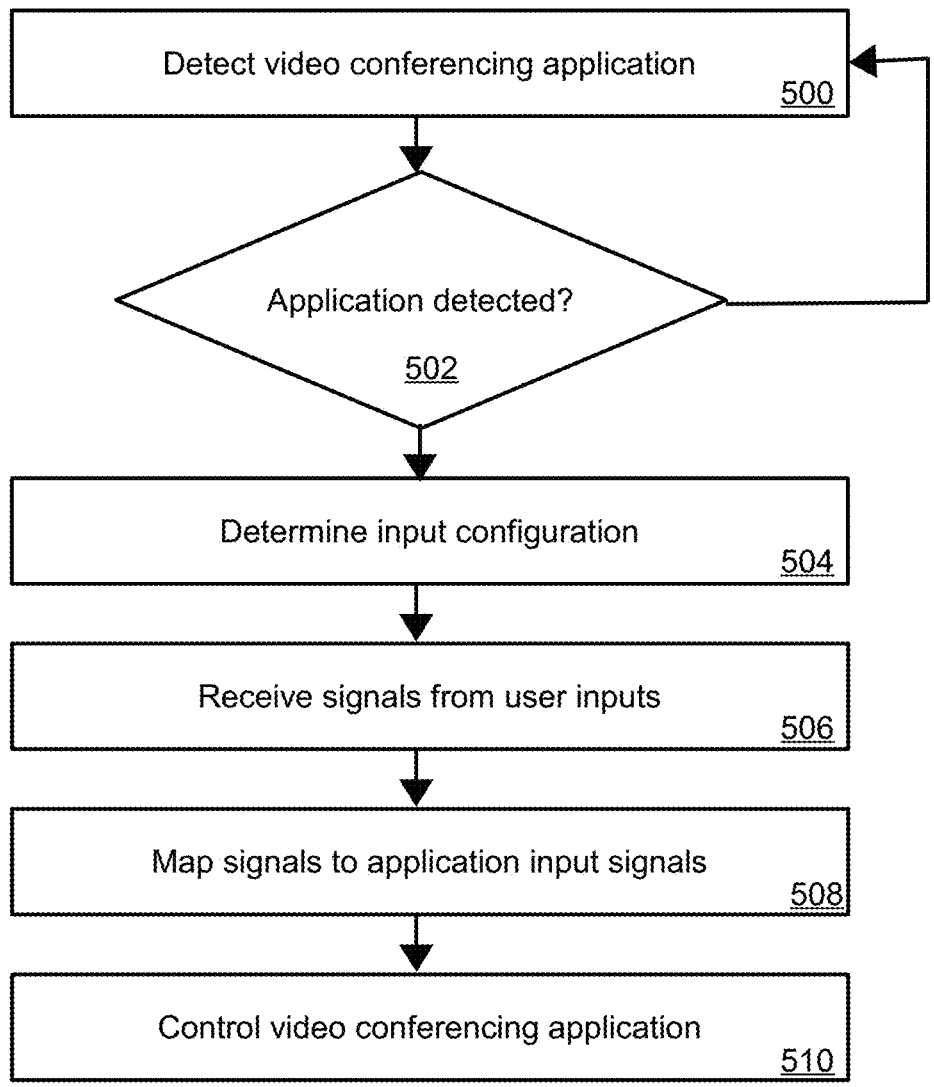
FIG. 5 shows a flow diagram for a method for controlling a video conferencing application according to non-limiting embodiments.

Referring now to FIG. 5, a flow diagram for a method for controlling a video conferencing application is shown according to non-limiting embodiments. The method shown in FIG. 5 is for example purposes only. It will be appreciated that non-limiting embodiments of the method may include fewer, additional, different, and/or a different order of steps than shown in FIG. 5. At step 500, a video conferencing application is detected. Detecting a video conferencing application may include, for example, monitoring active applications being executed on a computing device. In some examples, detecting a video conferencing application may include checking whether a predetermined list of applications is being executed on a computing device. At step 502, it is determined whether a video conferencing application has been detected. If no detection has been made, the method proceeds back to step 500 and the method will continually and/or periodically detect a video conferencing application.

With continued reference to FIG. 5, if a video conferencing application is detected at step 502, the method proceeds to step 504 and an input configuration is determined based on the detected video conferencing application. For example, if a first video conferencing application is detected, input configurations for the first video conferencing application may be retrieved from the video conferencing application itself, from a data file associated with the video conferencing application, and/or from an aggregated set of input configurations for various different video conferencing applications. After the input configuration is determined for the detected video conferencing application, the user may operate the media control device by providing user input (e.g., selecting buttons and/or the like) and the computing device may receive signals from user inputs at step 506. The signals may be associated with different buttons or other selectable options on the media control device.

Still referring to FIG. 5, at step 508, the signals received from the media control device are mapped to application input signals. For example, based on the input configuration determined at step 504, a particular signal may be mapped to a keystroke or other action used for controlling the video conferencing application. As an example, if a first video conferencing application has an input configuration in which a "screen share" functionality is activated by pressing "SHIFT+S", a button for "screen share" on the media control device may produce a signal that is mapped to "SHIFT+S". As another example, if a first video conferencing application has an input configuration in which a microphone is muted by pressing "F10" on a keyboard, a button for "mute" on the media control device may produce a signal that is mapped to "F10". In some non-limiting embodiments, application input signals may include keystrokes, mouse movements, macros, operating system-level commands, and/or the like. At step 510, after mapping one or more signals from the media controller to an application input signal, the video conferencing application may be controlled based on the application input signal. For example, the computing device (through the operating system or an application executing thereon) may produce an emulated keyboard signal by sending an operating system-level command for "SHIFT+S", "F10", a mouse action, and/or the like.

Figure 6:
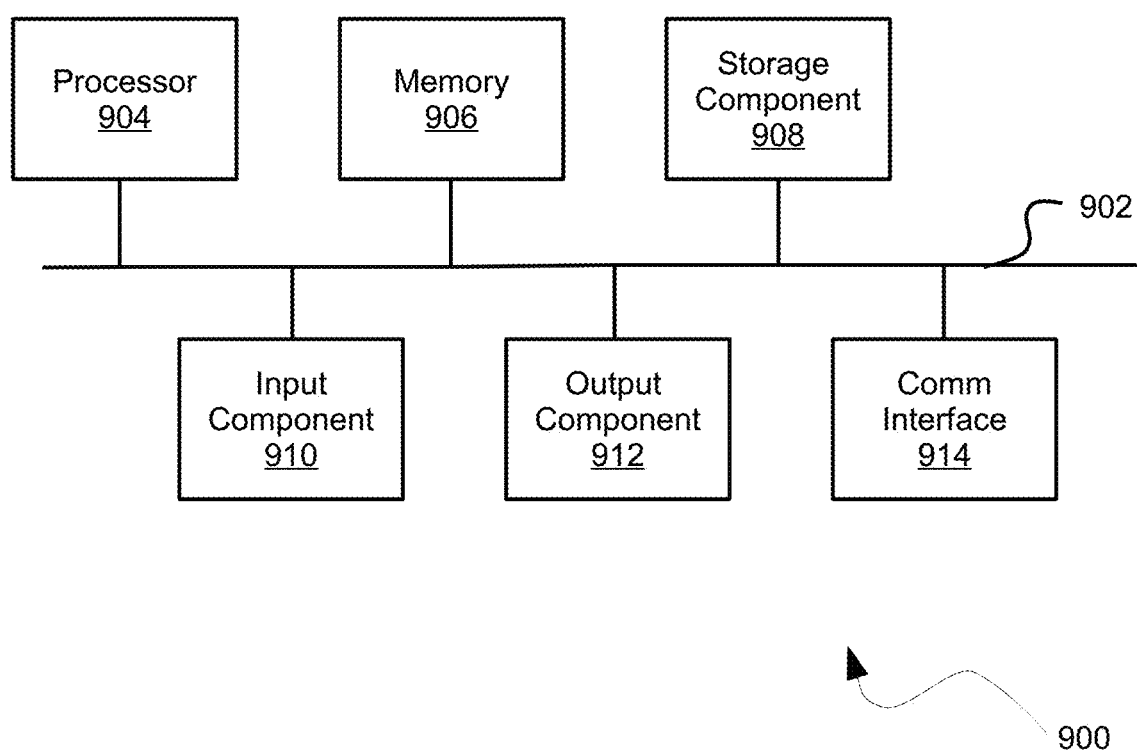
FIG. 6 illustrates example components of a computing device used in connection with non-limiting embodiments.

Referring now to FIG. 6, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 6. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A media control device system comprising:
　(a) a media control device comprising:
　　a housing;
　　a user interface configured to receive user input, the user interface comprising a plurality of buttons arranged on the housing, each button of the plurality of buttons associated with a different video conferencing function; and
　　a communication interface configured to establish communication with a separate computing device; and
　(b) a computer-readable non-transitory medium including program instructions that, when executed by a processor of the separate computing device, cause the separate computing device to:
　　detect a video conferencing application being executed by the separate computing device, wherein the separate computing device is separate from the media control device;
　　in response to detecting the video conferencing application, determine an input configuration of the video conferencing application from a plurality of input configurations associated with a plurality of different video conferencing applications;

receive a plurality of signals from the media control device via the communication interface, the plurality of signals representing a plurality of different user inputs engaging at least one button of the plurality of buttons;

map the plurality of signals to a plurality of video conferencing application input signals based on the input configuration; and control the video conferencing application based on the video conferencing application input signals.

2. The media control device system of claim 1, wherein the program instructions are part of a device driver executing on the separate computing device.

3. The media control device system of claim 1, wherein the video conferencing application is controlled based on the video conferencing application input signals by emulating, by the processor, the at least one video conferencing application input signal.

4. The media control device system of claim 3, wherein emulating the at least one video conferencing application input signal comprises generating at least one operating system-level command.

5. A media control device comprising:
a housing;
a user interface configured to receive user input arranged on the housing, the user interface comprising a plurality of buttons, each button of the plurality of buttons associated with a different video conferencing function;
a communication interface configured to establish communication with a separate computing device, the separate computing device separate from the housing; and
a controller arranged in the housing and in communication with the user interface and the communication interface, the controller configured to: generate signals based on the user input and control a plurality of different video conferencing applications executing on the separate computing device with the signals, the plurality of different video conferencing applications each associated with different input configurations, such that the signals are mapped to an input configuration of the different input configurations based on a video conferencing application of the plurality of different video conferencing applications.

6. The media control device of claim 5, wherein the controller generates the signals by converting the user input to keyboard inputs recognized by the video conferencing application.

7. A media control method comprising:
detecting, with a computing device, a video conferencing application being executed by the computing device;
in response to detecting the video conferencing application, determining, with the computing device, an input configuration of the video conferencing application from a plurality of input configurations associated with a plurality of different video conferencing applications;
receiving, with the computing device, at least one signal from a media control device separate from the computing device via a communication interface of the media control device, the at least one signal representing a user input on the media control device of a plurality of possible user inputs, wherein the user input comprises selection of at least one button of a plurality of buttons arranged on a housing of the media control device;
mapping the at least one signal to at least one video conferencing application input signal based on the input configuration; and
controlling the video conferencing application based on the at least one video conferencing application input signal.

8. The media control method of claim 7, wherein each button of the plurality of buttons produces a different signal when actuated, the method further comprising mapping each different signal to a different video conferencing application input signal based on the input configuration.

9. The media control method of claim 7, wherein a device driver installed on the computing device maps the at least one signal to the at least one video conferencing application input signal and controls the video conferencing application.

10. The media control method of claim 7, wherein controlling the video conferencing application based on the at least one video conferencing application input signal comprises emulating, with the computing device, the at least one video conferencing application input signal.

11. The media control method of claim 10, wherein emulating the at least one video conferencing application input signal comprises generating at least one operating system-level command.

* * * * *